United States Patent Office 3,741,951
Patented June 26, 1973

3,741,951
1-(p-BENZAMIDO)-3-METHYL-TRIAZENES
Fritz K. Hess, Hudson, and Patrick B. Stewart, St. Andrews East, Quebec, Canada, Karl Zeile, Ingelheim am Rhein, Germany, and Kurt Freter, Beaconsfield, Quebec, Canada, assignors to Boehringer Ingelheim G.m.b.H., Ingelheim am Rhein, Germany
No Drawing. Filed Dec. 16, 1971, Ser. No. 208,912
Claims priority, application Austria, Dec. 21, 1970, A 11,481/70
Int. Cl. C07c 115/00
U.S. Cl. 260—140         4 Claims ABSTRACT OF THE DISCLOSURE
Compounds of the formula

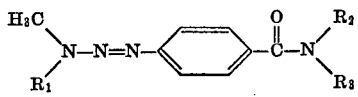

wherein
$R_1$ is cyclohexyl, phenyl-(alkylene of 1 to 2 carbon atoms) or pyridyl-(alkylene of 1 to 2 carbon atoms),
$R_2$ is hydrogen or alkyl of 1 to 2 carbon atoms, and
$R_3$ is straight or branched alkyl of 1 to 4 carbon atoms or cycloalkyl of 3 to 6 carbon atoms;
the compounds are useful as immunosuppressants.

---

This invention relates to novel 1 - (p-benzamido)-3-methyl-triazenes, as well as to a method of preparing these compounds.

More particularly, the present invention relates to a novel class of 3-disubstituted 1-(p-benzamido)-triazenes represented by the formula

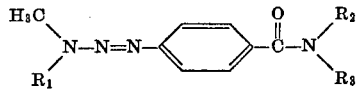

wherein
$R_1$ is cyclohexyl, phenyl-(alkylene of 1 to 2 carbon atoms) or pyridyl-(alkylene of 1 to 2 carbon atoms),
$R_2$ is hydrogen or alkyl of 1 to 2 carbon atoms, and
$R_3$ is straight or branched alkyl of 1 to 4 carbon atoms or cycloalkyl of 3 to 6 carbon atoms.

The compounds of the present invention may be prepared by diazotizing a p-amino-benzamide of the formula

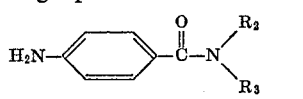

wherein $R_2$ and $R_3$ have the same meanings as in Formula I, and reacting the diazo compound thus obtained with a secondary amine of the formula

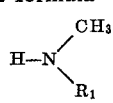

wherein $R_1$ has the same meanings as in Formula I.

The diazotization of the compound of the Formula II is carried out in conventional manner, that is, by dissolving or suspending the same in water, treating the aqueous solution or suspension with an excess of a concentrated mineral acid, such as hydrochloric acid, and then adding sodium nitrite, accompanied by cooling. After completion of the diazotization reaction, the resulting diazonium salt solution is slowly poured into a cooled solution which contains the amine of the Formula III as well as an excess of an aqueous solution of a base, such as sodium carbonate, and the desired end product of the Formula I is isolated from the reaction solution in conventional manner. Those compounds of Formula I wherein $R_1$ means pyridyl-(alkylene of 1 to 2 carbon atoms) form acid addition salts with strong mineral acids, e.g. hydrohalide acids.

The following end products of the Formula I and the acid addition salts of those end products, wherein $R_1$ means pyridyl-(alkylene of 1 to 2 carbon atoms) may be prepared by the above described process:

1-[p-(N-cyclohexyl-benzamido)]-3-methyl-3-[α-(m-picolyl)]-triazene;
1-[p-(N-isopropyl-benzamido)]-3-methyl-3-[α-(o-picolyl)]-triazene;
1-[p-(N-isopropyl-benzamido)]-3-methyl-3-[α-(m-picolyl)]-triazene;
1-[p-(N-isopropyl-benzamido)]-3-methyl-3-[α-(p-picolyl)]-triazene;
1-[p-(N-isopropyl-benzamido)]-3-methyl-3-cyclohexyl-triazene;
1-[p-(N-isopropyl-benzamido)]-3-methyl-3-benzyl-triazene;
1-[p-(N-methyl-benzamido)]-3-methyl-3-[β-(o-pyridylethyl)]-triazene;
1-[p-(N-propyl-benzamido)]-3-methyl-3-[α-(m-picolyl)]-triazene;
1-[p-(N-propyl-benzamido)]-3-methyl-3-[α-(p-picolyl)]-triazene;
1-[p-(N-isobutyl-benzamido)]-3-methyl-3-[α-(o-picolyl)]-triazene;
1-[p-(N-isobutyl-benzamido)]-3-methyl-3-[α-(m-picolyl)]-triazene;
1-[p-(N-cyclopropyl-benzamido)]-3-methyl-3-[α-(m-picolyl)]-triazene;
1-[p-(N-isopropyl-benzamido)]-3-methyl-3-β-(phenylethyl)-triazene;
1-[p-(N-methyl-benzamido)]-3-methyl-3-[α-(m-picolyl)]-triazene;
3-[p-(N-isopropyl-benzamido)]-3-methyl-3-[β-(o-pyridylethyl)]-triazene;
1-[p-(N-ethyl-benzamido)]-3-methyl-3-[β-(o-pyridylethyl)]-triazene;
1-[p-(N-propyl-benzamido)]-3-methyl-3-[β-(o-pyridylethyl)]-triazene;
1-[p-(N-cyclopropyl-benzamido)]-3-methyl-3-[β-(o-pyridylethyl)]-triazene;
1-[p-(N-propyl-benzamido)-3-methyl-3-[α-(o-picolyl)]-triazene;
1-[p-(N-cyclohexyl-benzamido)]-3-methyl-3-[α-(o-picolyl)]-triazene;
1-[p-(N-cyclohexyl-N-methyl-benzamido)]-3-methyl-3-[α-(o-picolyl)]-triazene;
1-[p-(N-ethyl-benzamido)]-3-methyl-3-[α-(o-picolyl)]-triazene;
1-[p-(N-ethyl-benzamido)]-3-methyl-3-[α-(m-picolyl)]-triazene;
1-[p-(N-ethyl-benzamido)]-3-methyl-3-[α-(p-picolyl)]-triazene;
1-[p-(N,N-diethyl-benzamido)]-3-methyl-3-[α-(o-picolyl)]-triazene;
1-[p-(N-isobutyl-benzamido)]-3-methyl-3-[α-(p-picolyl)]-triazene;
1-[p-(N-methyl-benzamido)]-3-methyl-3-[α-(o-picolyl)]-triazene;
1-[p-(N-cyclopropyl-benzamido)]-3-methyl-3-[α-(o-picolyl)]-triazene;
1-[p-(N-cyclohexyl-N-methyl-benzamido)]-3-methyl-3-β-phenylethyl-triazene;
1-[p-(N-cyclohexyl-N-methyl-benzamido)]-3-methyl-3-[α-(o-pyridylethyl)]-triazene;
1-[p-(N-propyl-benzamido)]-3-methyl-3-β-phenylethyl-triazene;

1-[p-(N-cyclohexyl-benzamido)]-3-methyl-3-[β-(o-pyridylethyl)]-triazene;
1-[p-(N-isopropyl-benzamido)]-3-methyl-3-[α-(m-picolyl)]-triazene;
1-[p-(N-propyl-benzamido)]-3-methyl-3-[α-(o-picolyl)]-triazene;
1-[p-(N-cyclohexyl-benzamido)]-3-methyl-3-β-phenylethyl-triazene;
1-[p-(N,N-diethyl-benzamido)]-3-methyl-3-β-phenylethyl-triazene;
1-[p-(N,N-diethyl-benzamido)]-3-methyl-3-[β-(o-pyridylethyl)]-triazene;
1-[p-(N-cyclohexyl-benzamido)]-3-methyl-3-[α-(p-picolyl)]-triazene; and
1-[p-(N-ethyl-benzamido)]-3-methyl-3-β-phenylethyl-triazene.

The p-aminocarbonyl-anilines of the Formula II used as starting compounds in the above process may, for example, be prepared by reacting a p-nitro-benzoyl halide of the formula

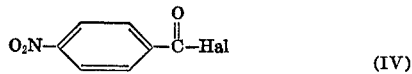

wherein Hal is halogen, preferably chlorine, with an excess of an amine of the formula

wherein $R_2$ and $R_3$ have the same meanings as in Formula I, in the presence of an inert organic solvent, such as methylene chloride or benzene, followed by reduction of the p-nitro-benzamide formed thereby, for instance with nascent hydrogen generated in situ by iron filings and an aqueous mineral acid, or with hydrogen in the presence of platinum oxide in ethanol.

The following examples further illustrate the present invention and will enable others skilled in the art to understand it more completely. It should be understood, however, that the invention is not limited solely to the particular examples given below.

EXAMPLE 1

1-[p-(N-cyclohexyl-benzamido)]-3-methyl-3-[α-(m-picolyl)]-triazene

A suspension of 6.1 gm. of p-(N-cyclohexyl-carbamoyl)-aniline in 200 ml. of water was cooled to 10° C., 5.3 ml. of concentrated hydrochloric acid were added, the acidic solution was cooled to 5° C. and, while maintaining the temperature between 1 and 5° C., it was slowly admixed with a solution of 2 gm. of sodium nitrite in 5 ml. of water. Small portions of the resulting aqueous diazonium salt solution were added at 0 to 5° C. to a mixture consisting of 4.1 gm. of N-methyl-3-picolylamine, 700 ml. of ether and 40 ml. of 2 N aqueous sodium carbonate, whereby a precipitate was formed. The reaction mixture was stirred for one hour, whereupon 300 ml. of chloroform were added, the organic phase was isolated, and the aqueous phase was repeatedly extracted with chloroform. The combined chloroform solutions were purified, dried and evaporated, and the residue was recrystallized from benzene, yielding 6.4 gm. (65% of theory) of the compound of the formula

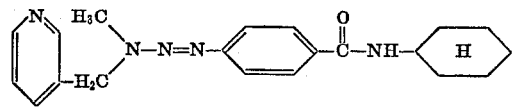

having a melting point of 157–159° C.

EXAMPLE 2

1-[p-(N-isopropyl-benzamido)]-3-cyclohexyl-3-methyl-triazene 5 gm. of p-(N-isopropyl-carbamoyl)-anilene were diazotized with sodium nitrite, as described in Example 1. The resulting aqueous diazonium salt solution was added in small portions at 0 to 5° C. to a mixture consisting of 3.84 gm. of N-methyl-cyclohexylamine, 500 ml. of ether and 40 ml. of 2 N aqueous sodium carbonate, and the resulting mixture was stirred for one hour in the cold. The reaction mixture was then worked up as described in the preceding example, and the evaporation residue was recrystallized from benzene, yielding 5.8 gm. (68% of theory) of the compound of the formula

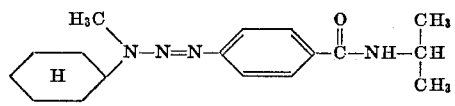

having a melting point of 160–161° C.

The starting compound, p-(N-isopropyl-carbamoyl)-aniline, was prepared in the following manner:

(A) p-Nitro-N-isopropyl-benzamide 185 gm. (3.13 mols) of isopropylamine were added to a suspension of 250 gm. (1.35 mols) of p-nitro-benzoyl chloride in 2500 ml. of methylene chloride at a rate such that the temperature of the mixture was able to be kept below 40° C. Thereafter, the mixture was refluxed for two hours, then cooled to room temperature, and the white precipitate formed thereby was separated by filtration. The filtrate was evaporated to dryness, and the residue was recrystallized from chloroform/petroleum ether, yielding 259 gm. (92% of theory) of the compound of the formula

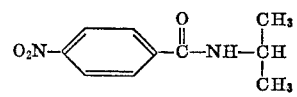

having a melting point of 156.5–158.5° C.

(B) p-(N-isopropyl-carbamoyl)-aniline (a) BY CATALYTIC REDUCTION

A solution of 40 gm. of p-nitro-N-isopropyl-benzamide in 800 ml. of ethanol containing 1 gm. of platinum oxide was hydrogenated until termination of the absorption of hydrogen. Thereafter, the catalyst was filtered off, and the filtrate was evaporated leaving 33.5 gm. (98% of theory) of the compound of the formula

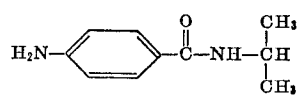

having a melting point of 143–145° C. It was used as the starting compound in Example 2 without further purification.

(b) By reduction with nascent hydrogen 250 gm. of iron filings were added to a suspension of 250 gm. of p-nitro-N-isopropyl-benzamide in 2000 ml. of ethanol, and the mixture was stirred for 15 minutes at room temperature. Thereafter, 1000 ml. of water were added, and then 600 ml. of 4 N hydrochloric acid were added dropwise over a period of two hours, whereby the temperature of the reaction mixture slowly rose to 70° C. After all of the acid had been added, the reaction mixture was stirred for two hours, then made alkaline with 5 N sodium hydroxide, and filtered. The filtrate was dried, the solvent was evaporated, and by addition of ether/petroleum ether to the residue 197 gm. of white crystalline p-(N-isopropyl-carbamoyl)-aniline were obtained, which was used as the starting compound in Example 2 without further purification.

EXAMPLE 3

1-[p-(N-isopropyl-benzamido)]-3-methyl-3-[α-(m-picolyl)]-triazene 5 gm. of p-(N-isopropyl-carbamoyl)-aniline were diazotized as described in Example 1, the resulting diazonium salt solution was neutralized with aqueous sodium carbonate, and then a mixture consisting of 4.1 gm. of N-(m-picolyl)-methylamine, 700 ml. of ethyl ether and 40 ml. of aqueous 2 N sodium carbonate was added in small portions at 5° C. Thereafter, the reaction mixture was extracted with ether, and the ether phase was separated, washed with water, dried and evaporated. The residue was recrystallized from n-hexane/benzene, yielding 2.8 gm. (32% of theory) of the compound of the formula

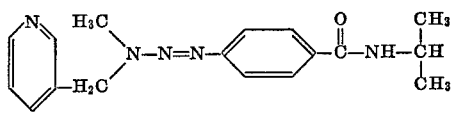

having a melting point of 116–117° C.

EXAMPLE 4

1-[p-(N-isobutyl-benzamido)]-3-methyl-3-[α-(m-picolyl)]-triazene 5.4 gm. of p-(N-isobutyl-carbamoyl)-aniline were diazotized in a manner analogous to that described in Example 1, and the resulting diazonium salt solution was neutralized with 2 N sodium hydroxide and then slowly added to a mixture consisting of 4.05 gm. of N-(m-picolyl)-methylamine, 700 ml. of ether and 40 ml. of 2 N sodium hydroxide. The oil (8.5 gm.) remaining after working up the reaction mixture slowly crystallized after addition of acetone/ether in the cold. The crystals were collected and recrystallized from ether, yielding 3.6 gm. (39% of theory) of the compound of the formula

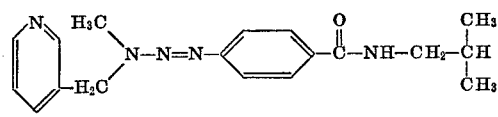

having a melting point of 70–72° C.

EXAMPLE 5

Using a procedure analogous to that described in Example 1, 1-[p-(N-isopropyl-benzamido)]-3 - methyl - 3-benzyl-triazine, M.P. 141–142° C., of the formula

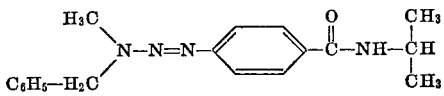

was prepared by diazotizing p-(N-isopropyl-carbamoyl)-aniline and reacting the resulting diazonium salt with N-benzyl-methylamine.

EXAMPLE 6

Using a procedure analogous to that described in Example 1, 1-[p-(N-isopropyl-benzamido)]-3-methyl-3-[α-(p-picolyl)]-triazene, M.P. 110–111° C., of the formula

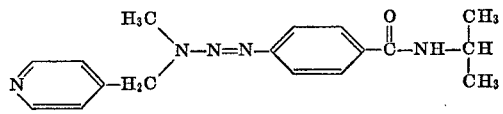

was prepared by diazotizing p-(N-isopropyl-carbamoyl)-aniline and reacting the resulting diazonium salt with N-(p-picolyl)-methylamine.

EXAMPLE 7

Using a procedure analogous to that described in Example 1, 1-[p-(N-isopropyl-benzamido)]-3-methyl-3-[α-(o-picolyl)]-triazene, M.P. 126° C., of the formula

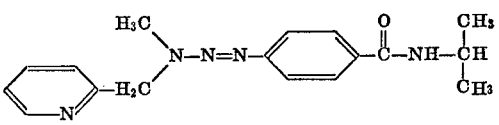

was prepared by diazotizing p-(N-isopropyl-carbamoyl)-aniline and reacting the resulting diazonium salt with N-(o-picolyl)-methylamine.

EXAMPLE 8

Using a procedure analogous to that described in Example 1, 1-[p-(N-cyclopropyl - benzamido)] - 3 - methyl-3-[α-(m-picolyl)] - triazene, M.P. 109–111° C., of the formula

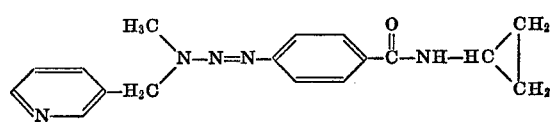

was prepared by diazotizing p-(N-cyclopropyl-carbamoyl)-aniline and reacting the resulting diazonium salt with N-(m-picolyl)-methylamine.

EXAMPLE 9

Using a procedure analogous to that described in Example 1, 1-[p-(N-n-propyl-benzamido)]-3-methyl - 3 - [α-(m-picolyl)]-triazene, M.P. 97–98° C., of the formula

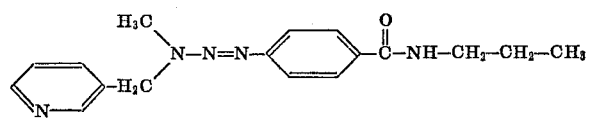

was prepared by diazotizing p-(N-n-propyl-carbamoyl)-aniline and reacting the resulting diazonium salt with N-(m-picolyl)-methylamine.

EXAMPLE 10

Using a procedure analogous to that described in Example 1, 1-[p-(N-methyl-benzamido)]-3 - methyl - 3 -[α-(m-picolyl)]-triazene, M.P. 104–106° C., of the formula

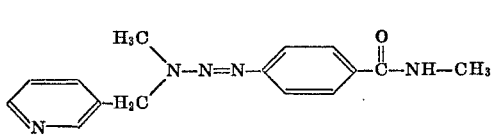

was prepared by diazotizing p-(N-methyl-carbamoyl)-aniline and reacting the resulting diazonium salt with N-(m-picolyl)-methylamine.

EXAMPLE 11

Using a procedure analogous to that described in Example 1, 1-[p-(N-isopropyl-benzamido)]-3 - methyl - 3-[β-(o-pyridyl)-ethyl]-triazene, M.P. 102–104° C., of the formula

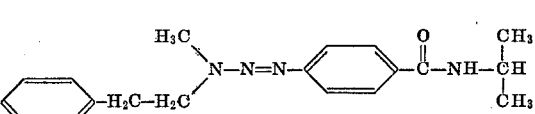

was prepared by diazotizing p-(N-isopropyl-carbamoyl)-anilene and reacting the resulting diazonium salt with N-[β-(o-pyridyl)-ethyl]-methylamine.

EXAMPLE 12

Using a procedure analogous to that described in Example 1, 1-[p-(N-n-propyl - benzamido)] - 3 - methyl-3-[α-(p-picolyl)]-triazene, M.P. 114–115.5° C., of the formula

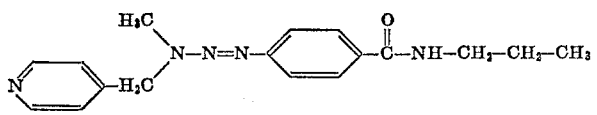

was prepared by diazotizing p-(N-n-propyl-carbamoyl)-aniline and reacting the resulting diazonium salt with N-(p-picolyl)-methylamine.

EXAMPLE 13

Using a procedure analogous to that described in Example 1, 1-[p-(N-isobutyl-benzamido)] - 3 - methyl - 3-[α-(o-picolyl)]-triazene, M.P. 90–91° C., of the formula

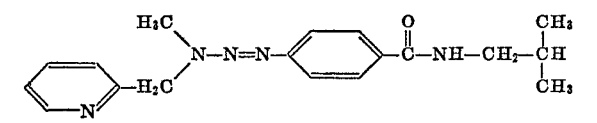

was prepared by diazotizing p-(N-isobutyl-carbamoyl)-aniline and reacting the resulting diazonium salt with N-(o-picolyl)-methylamine.

EXAMPLE 14

Using a procedure analogous to that described in Example 1, 1-[p-(N-isopropyl-benzamido)] - 3 - methyl - 3-(β-phenethyl)-triazene, M.P. 105° C., of the formula

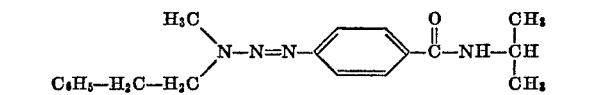

was prepared by diazotizing p-(N-isopropyl-carbamoyl)-aniline and reacting the resulting diazonium salt with N-(β-phenethyl)-methylamine.

EXAMPLE 15

Using a procedure analogous to that described in Example 1, 1-[p-(N-n-propyl-benzamido)] - 3 - methyl - 3-[α-(o-picolyl)]-triazene, M.P. 130.5–132.5° C., of the formula

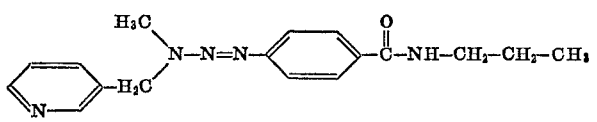

was prepared by diazotizing p-(N-n-propyl-carbamoyl)-aniline and reacting the resulting diazonium salt with N-(o-picolyl)-methylamine.

EXAMPLE 16

Using a procedure analogous to that described in Example 1, 1-[p-(N-methyl-N-cyclohexyl - benzamido)] - 3-methyl-3-[α-(o-picolyl]-triazene, M.P. 123–124° C., of the formula

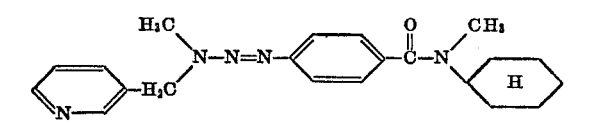

was prepared by diazotizing p-(N-methyl-N-cyclohexyl-carbamoyl)-aniline and reacting the resulting diazonium salt with N-(o-picolyl)-methylamine.

EXAMPLE 17

Using a procedure analogous to that described in Example 1, 1 - [p-(N-isobutyl-benzamido)]-3-methyl-3-[α-(p-picolyl)]-triazene, M.P. 76–77° C., of the formula

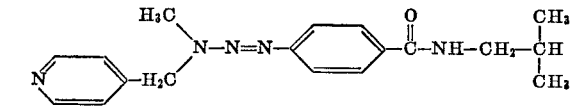

was prepared by diazotizing p-(N-isobutyl-carbamoyl)-aniline and reacting the resulting diazonium salt with N-(p-picolyl)-methylamine.

EXAMPLE 18

Using a procedure analogous to that described in Example 1, 1-[p-(N-methyl-benzamido)]-3-methyl-3-[α-(o-picolyl)]-triazene, M.P. 103.5–104.5° C., of the formula

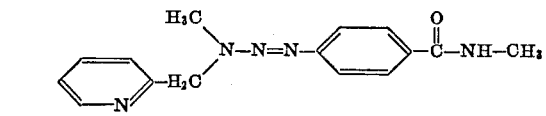

was prepared by diazotizing p-(N-methyl-carbamoyl)-aniline and reacting the resulting diazonium salt with N-(o-picolyl)-methylamine.

EXAMPLE 19

Using a procedure analogous to that described in Example 1, 1-[p-(N-cyclopropyl-benzamido)]-3-methyl-3-[α-(o-picolyl)]-triazene, M.P. 140–142° C., of the formula

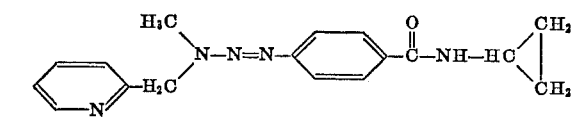

was prepared by diazotizing p-(N-cyclopropyl-carbamoyl)-aniline and reacting the resulting diazonium salt with N-(o-picolyl)-methylamine.

EXAMPLE 20

Using a procedure analogous to that described in Example 1, 1-[p-(N-cyclohexyl-benzamido)]-3-methyl-3-[α-(o-picolyl)]-triazene, M.P. 163–164° C., of the formula

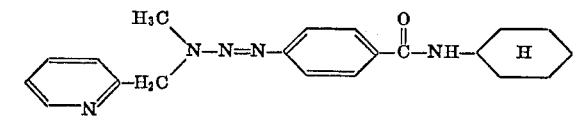

was prepared by diazotizing p-(N-cyclohexyl-carbamoyl)-aniline and reacting the resulting diazonium salt with N-(o-picolyl)-methylamine.

EXAMPLE 21

Using a procedure analogous to that described in Example 1, 1 - [p-(N-methyl-N-cyclohexyl-benzamido)]-3-methyl-3-β-phenethyl)-triazene, M.P. 90–92° C., of the formula

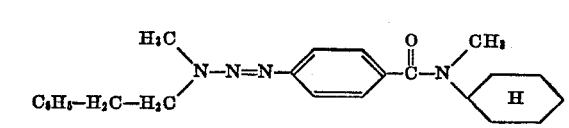

was prepared by diazotizing p-(N-methyl-N-cyclohexyl-carbamoyl)-aniline and reacting the resulting diazonium salt with N-(β-phenethyl)-methylamine.

EXAMPLE 22

Using a procedure analogous to that described in Example 1, 1 - [p-(N-methyl-N-cyclohexyl-benzamido)]-3-methyl-3-[β-(o-pyridyl)-ethyl]-triazene, M.P. 92–94° C., of the formula

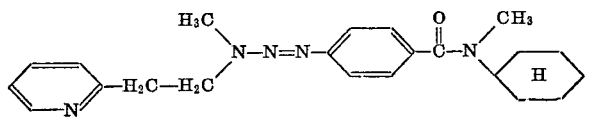

was prepared by diazotizing p-(N-methyl-N-cyclohexyl-carbamoyl)-aniline and reacting the resulting diazonium salt with N-[β-(o-pyridyl)-ethyl]-methylamine.

EXAMPLE 23

Using a procedure analogous to that described in Example 1, 1 - [p-(N-n-propylbenzamido)]-3-methyl-3-(β-phenethyl)-triazene, M.P. 108–110° C., of the formula

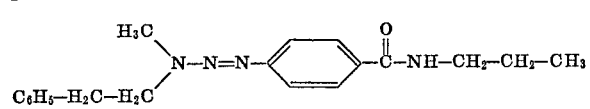

was prepared by diazotizing p-(N-n-propyl-carbamoyl)-aniline and reacting the resulting diazonium salt with N-(β-phenethyl)-methylamine.

EXAMPLE 24

Using a procedure analogous to that described in Example 1, 1-[p-(N-cyclohexyl-benzamido)]-3-methyl-3-[β-(o-pyridyl)-ethyl]-triazene, M.P. 107–108° C., of the formula

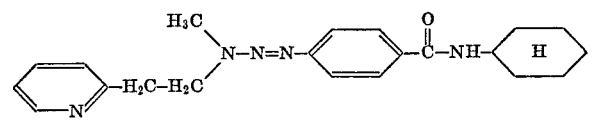

was prepared by diazotizing p-(N-cyclohexyl-carbamoyl)-aniline and reacting the resulting diazonium salt with N-[β-(o-pyridyl)-ethyl]-methylamine.

EXAMPLE 25

Using a procedure analogous to that described in Example 1, 1-[p-(N-isopropyl-benzamido)]-3-methyl-3-[α-(m-picolyl)]-triazene, M.P. 118–119° C. (hydrochloride), of the formula

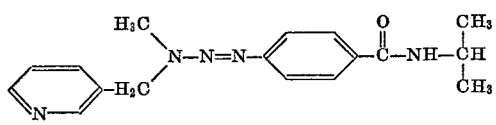

was prepared by diazotizing p-(N-isopropyl-carbamoyl)-aniline and reacting the resulting diazonium salt with N-(m-picolyl)-methylamine and converting the compound thus obtained into its hydrochloride in the usual manner.

EXAMPLE 26

Using a procedure analogous to that described in Example 1, 1-[p-(N-n-propyl-benzamido)] - 3 - methyl-3-[α-(o-picolyl)]-triazene, M.P. 110–111° C. (hydrochloride), of the formula

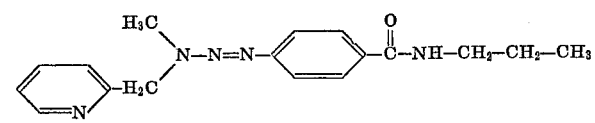

was prepared by diazotizing p-(N-n-propyl-carbamoyl)-aniline and reacting the resulting diazonium salt with N-(o-picolyl)-methylamine and converting the compound thus obtained into its hydrochloride in the usual manner.

EXAMPLE 27

Using a procedure analogous to that described in Example 1, 1-[p-(N-cyclohexyl-benzamido)] - 3 - methyl-3-(β-phenethyl)-triazene, M.P. 122–123° C., of the formula

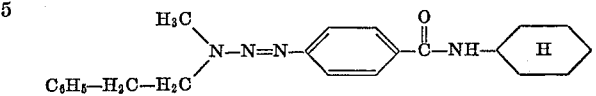

was prepared by diazotizing p-(N-cyclohexyl-carbamoyl)-aniline and reacting the resulting diazonium salt with N-(β-phenethyl)-methylamine.

EXAMPLE 28

Using a procedure analogous to that described in Example 1, 1-[p-(N,N-diethyl-benzamido)] - 3 - methyl-3-(β-phenethyl)-triazene, an oil of the formula

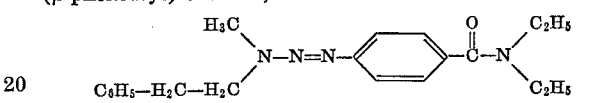

was prepared by diazotizing p-(N,N-diethyl-carbamoyl)-aniline and reacting the resulting diazonium salt with N-(β-phenethyl)-methylamine.

EXAMPLE 29

Using a procedure analogous to that described in Example 1, 1-[p-(N,N-diethyl-benzamido)] - 3 - methyl-3-[β-(o-pyridyl)-ethyl]-triazene, an oil of the formula

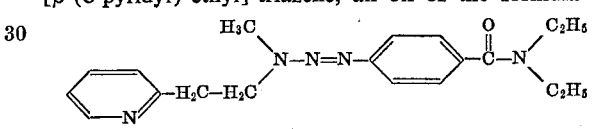

was prepared by diazotizing p-(N,N-diethyl-carbamoyl)-aniline and reacting the resulting diazonium salt with N-[β-(o-pyridyl)-ethyl]-methylamine.

EXAMPLE 30

Using a procedure analogous to that described in Example 1, 1-[p-(N-cyclohexyl-benzamido)] - 3 - methyl-3 - [α-(p-picolyl)]-triazene, M.P. 125–126° C., of the formula

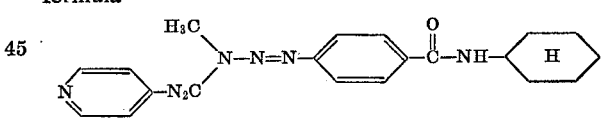

was prepared by diazotizing p-(N-cyclohexyl-carbamoyl)-aniline and reacting the resulting diazonium salt with N-(p-picolyl)-methylamine.

EXAMPLE 31

Using a procedure analogous to that described in Example 1, 1-[p-(N-ethyl-benzamido)] - 3 - methyl-3-(β-phenethyl)-triazene, M.P. 100–101° C., of the formula

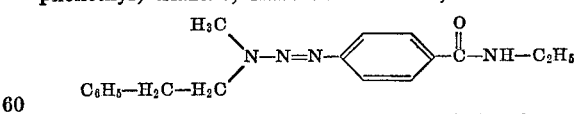

was prepared by diazotizing p-(N - ethyl-carbamoyl)-aniline and reacting the resulting diazonium salt with N-(β-phenethyl)-methylamine.

The compounds according to the present invention, that is, those embraced by Formula I, have useful pharmacodynamic properties. More particularly, the compounds of the instant invention exhibit very strong immunosuppressant activities in warm-blooded animals and are therefore useful as anti-immunogenics in conjunction with therapy following organ transplantation as well as other diseases caused by increased formation of antibodies.

For instance, in the agar plaques test according to Jerne, the daily administration of 100 mgm./kg. of 1-[p-(N-isopropyl - benzamido)] - 3 - methyl - 3 - [α-(m-picolyl)]-triazene or 1-[p-(N - isopropyl-benzamido)]-3- methyl - 3 - [α - (o - picolyl)] - triazene practically completely suppressed (96% and 93.3%, respectively) the immunity produced by sheeps' erythrocytes. An immunosuppressant activity of such magnitude could heretofore be achieved with antilymphocyte serum or with large doses of procarbazine [N-isopropyl - α - (2 - methylhydrazino) - p - toluamide], both of which, however, produce strong undesirable side effects which the compounds of the instant invention do not produce.

For pharmaceutical purposes the compounds according to the present invention are administered to warm-blooded animals perorally as active ingredients in customary dosage unit compositions, that is, compositions in dosage unit form consisting essentially of an inert pharmaceutical carrier and one effective dosage unit of the active ingredient, such as tablets, coated pills, capsules, wafers, powders, solutions, suspensions, emulsions, syrups and the like. The daily effective immunosuppressant dosage of the compounds according to the present invention is from 0.83 to 5.0 mgm./kg. body weight, which may be administered in from one to four single doses.

The following examples illustrate a few pharmaceutical dosage unit compositions comprising a compound of the present invention as an active ingredient and represent the best modes contemplated of putting the invention into practical use. The parts are parts by weight unless otherwise specified.

EXAMPLE 32

Coated pills

The pill core composition is compounded from the following ingredients:

| | Parts |
|---|---|
| 1 - [p - (N - isopropyl -benzamido)] - 3 - methyl-3-[α-(o-picolyl)]-triazene | 100.0 |
| Lactose | 60.0 |
| Corn starch | 35.0 |
| Gelatin | 3.0 |
| Magnesium stearate | 2.0 |
| Total | 200.0 |

Preparation: The triazene compound is intimately admixed with the lactose and the corn starch, the mixture is moistened with an aqueous 10% solution of the gelatin, the moist mass is forced through a 1 mm.-mesh screen, the resulting granulate is dried at 40° C. and again passed through the screen, the dry granulate is admixed with the magnesium stearate, and the resulting composition is compressed into 200 mgm.-pill cores which are subsequently coated with a thin shell consisting essentially of a mixture of titanium dioxide, sugar, talcum and gum arabic, and finally polished with beeswax. Each coated pill contains 100 mgm. of the triazene compound and is an oral dosage unit composition with effective immuosuppressant action.

EXAMPLE 33

Tablets

The tablet composition is compounded from the following ingredients:

| | Parts |
|---|---|
| 1 - [p-(N-isopropyl-benzamido)]-3 - methyl-3-[α-(m-picolyl)]-triazene | 100.0 |
| Lactose | 70.0 |
| Corn starch | 50.0 |
| Soluble starch | 7.0 |
| Magnesium stearate | 3.0 |
| Total | 230.0 |

Preparation: The triazene compound is intimately admixed with the magnesium stearate, the mixture is moistened with an aqueous solution of the soluble starch, the moist mass is granulated, the granulate is dried and intimately admixed with the lactose and the corn starch, and the resulting composition is compressed into 230 mgm. tablets in a conventional tablet making machine. Each tablet contains 100 mgm. of the triazene compound and is an oral dosage unit composition with effective immunosuppressant action.

Analogous results are obtained when any one of the other triazene compounds embraced by Formula I was substituted for the particular triazene in Examples 32 and 33. Likewise, the amount of active ingredient in these illustrative examples may be varied to achieve the dosage unit range set forth above, and the amounts and nature of the inert pharmaceutical carrier ingredients may be varied to meet particular requirements.

While the present invention has been illustrated with the aid of certain specific embodiments thereof, it will be readily apparent to others skilled in the art that the invention is not limited to these particular embodiments, and that various changes and modifications may be made without departing from the spirit of the invention or the scope of the appended claims.

We claim:

1. A compound of the formula

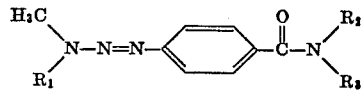

wherein
$R_1$ is cyclohexyl, phenyl-(alkylene of 1 to 2 carbon atoms) or pyridyl-(alkylene of 1 to 2 carbon atoms),
$R_2$ is hydrogen or alkyl of 1 to 2 carbon atoms, and
$R_3$ is alkyl of 1 to 4 carbon atoms or cycloalkyl of 3 to 6 carbon atoms.

2. An acid addition salt of a compound of formula

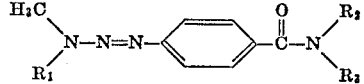

wherein
$R_1$ is pyridyl-(alkylene of 1 to 2 carbon atoms),
$R_2$ is hydrogen or alkyl of 1 to 2 carbon atoms, and
$R_3$ is alkyl of 1 to 4 carbon atoms or cycloalkyl of 3 to 6 carbon atoms.

3. A compound according to claim 1, which is 1-[p-(N-isopropyl-benzamido)]-3 - methyl - 3-[α-(m-picolyl)]-triazene and its acid addition salts.

4. A compound according to claim 1, which is 1-[p-(N-isopropyl-benzamido)] - 3-methyl - 3-[α-(o-picolyl)]-triazene and its acid addition salts.

References Cited

UNITED STATES PATENTS 3,162,571  12/1964  Adams et al. _____ 260—140 X

LEWIS GOTTS, Primary Examiner

C. F. WARREN, Assistant Examiner

U.S. Cl. X.R.

424—226

UNITED STATES PATENT OFFICE
CERTIFICATE OF CORRECTION

Patent No. 3,741,951    Dated June 26, 1973

Inventor(s) FRITZ K. HESS, PATRICK B. STEWART, KARL ZEILE and KURT FRETER

It is certified that error appears in the above-identified patent and that said Letters Patent are hereby corrected as shown below:

Column 7, that portion of the formulas of Examples 15 and 16 reading " 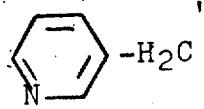 " should read --  --

Column 10, that portion of the formula of Example 30 reading " 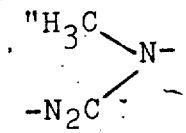 " should read -- 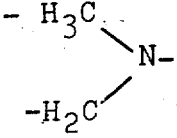 --

Signed and sealed this 20th day of August 1974.

(SEAL)
Attest:

McCOY M. GIBSON, JR.
Attesting Officer

C. MARSHALL DANN
Commissioner of Patents